G. H. MARTING.
MILK CAN.
APPLICATION FILED FEB. 1, 1909.
929,150.
Patented July 27, 1909.
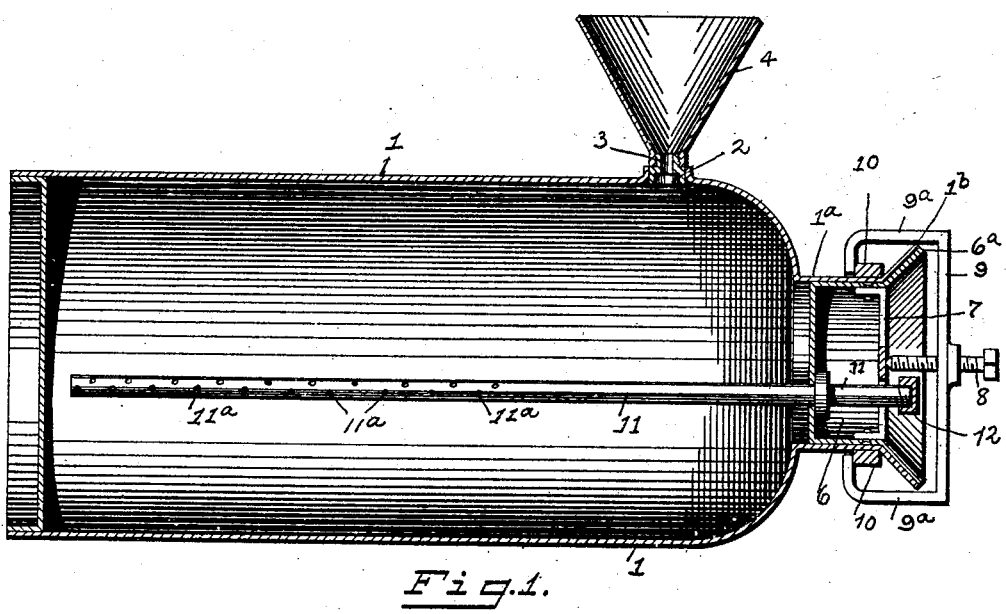
Fig. 1.
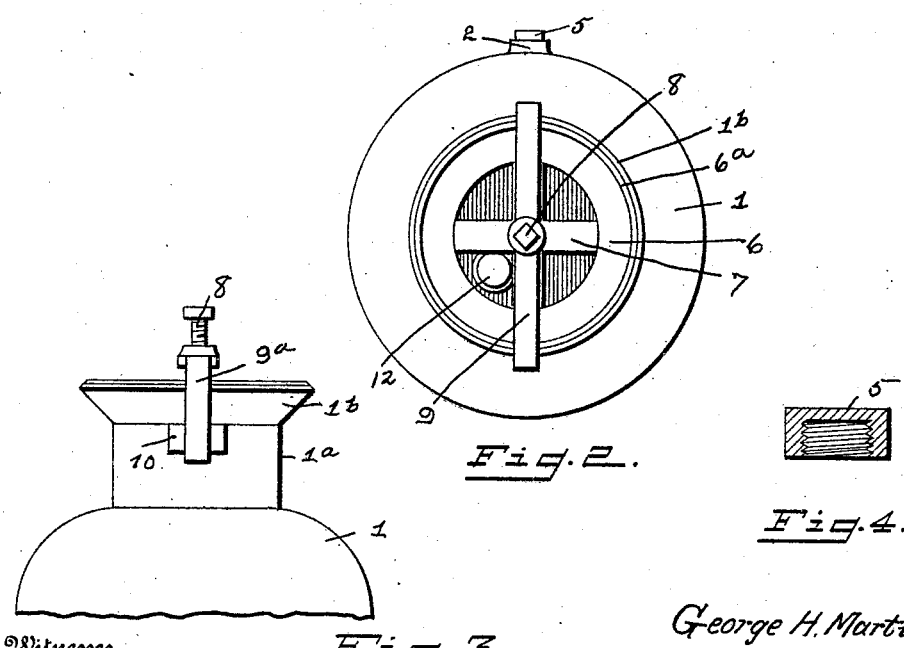
Fig. 2.
Fig. 3.
Fig. 4.
Witnesses
Carl Stoughton
A. L. Phelps
Inventor
George H. Marting
By C. C. Shepherd
Attorney

UNITED STATES PATENT OFFICE.

GEORGE H. MARTING, OF COLUMBUS, OHIO.

MILK-CAN.

No. 929,150.  Specification of Letters Patent.  Patented July 27, 1909.

Application filed February 1, 1909. Serial No. 475,462.

*To all whom it may concern:*

Be it known that I, GEORGE H. MARTING, a citizen of the United States, residing at Columbus, in the county of Franklin and State of Ohio, have invented certain new and useful Improvements in Milk-Cans, of which the following is a specification.

My invention relates to the improvement of milk cans and the objects of my invention are to provide a milk can of improved construction and arrangement of parts, which is adapted to receive the milk directly from the cow and which is adapted to be utilized in shipping the milk in a sealed condition without the transfer of the liquid from the original can or receptacle; to provide in conjunction with my improved can, improved means for aerating the milk contained therein, without necessitating the removal of the milk and to otherwise produce an improved construction of milk receiver and container which will insure the retention of the milk in a sanitary condition and reduce to a minimum the likelihood of dirt, germs or foreign matter being mingled with the milk either during the milking operation or during the shipment or storage of the can. These objects I accomplish in the manner illustrated in the accompanying drawing, in which:

Figure 1 is a central longitudinal section of my improved can, showing the same in position for milking therein, Fig. 2 is an end view of the can, Fig. 3 is an elevation of the can neck, and, Fig. 4 is an enlarged vertical section through a cap which I employ in the manner hereinafter described.

Similar numerals refer to similar parts throughout the several views.

In carrying out my invention, I employ a preferably cylindrical can body 1, which may have the general outline of an ordinary metallic milk shipping can and which is provided with the usual reduced neck extension $1^a$, having a flaring outer end termination $1^b$. At a suitable point in the can body, preferably adjacent to the forward end thereof, is provided an opening 2 into which is fixed a tubular plug 3 having an external threaded portion and with which is adapted to be detachably engaged either the threaded neck of a funnel 4, or an internally threaded cap such as is shown at 5 in Fig. 4 of the drawing. The mouth of the can or neck $1^a$, is provided with a suitable form of closure body 6 which may be of the substantially cup-form shown, said cup body being provided with a flaring mouth portion $6^a$ which conforms to the flare or inclination of the neck mouth $1^b$ within which said closure mouth is adapted to fit when the cup body is inserted within the can neck. While it is obvious that other suitable means may be provided for sealing the closure in connection with the can neck, the means which I have shown for this purpose, may be described as follows: Secured between opposite points of the inner surface of the closure body, are the arms of a cross frame or spider 7. Against the center and outer side of this spider frame is adapted to bear, one end of a screw 8, the outer portion of which has a threaded engagement with the center of the length of a C-clamp 9, the hook-like terminal arms $9^a$ of which extend over the mouth of the can neck and engage oppositely located lugs 10 which are affixed to said neck. It is obvious that by tightening or turning inward the screw 8, a clamping action of the screw against the frame 7 and of the clamp arms $9^a$ against the lugs 10 will be effected, which will result in holding the closure in close engagement with the can mouth and neck.

11 represents an air conducting pipe which extends from the mouth of the can through the inner end of the closure 6, thence into the can body a desirable distance, said pipe having within the can a desirable number of perforations $11^a$ and being provided on its outer end with a removable cap 12, corresponding in construction with the cap 5.

During the milking operation, the can body is adapted to lie in a horizontal or substantially horizontal position and the streams of milk from the cow's udder are directed into the can through the open-mouthed funnel 4. The can being filled or partially filled, the milk contained therein, may be thoroughly aerated by turning the can to a vertical position, removing the cap 12 from the air pipe 11 and directing air under pressure into said pipe. This being accomplished, the funnel body 4 may be removed and a cap such as that indicated at 5 utilized to close the opening 2. The can of milk is now ready for shipment to a city market supply or dairy, at which point it is received without having been opened or transferred to another receptacle.

It will be understood that any desirable or well known construction of breakable seal such as are commonly employed on sealed packages and which indicate whether or not the package has been opened or tampered with, may be employed in connection with the end closure plug or caps 5 and 12.

From the construction and operation described, it will be seen that by the employment of a can of comparatively simple construction, milk in a comparatively sanitary condition and thoroughly aerated, may be transferred in its original container from the dairy farm, to the dealer or user.

What I claim, is:

1. In a milk can, the combination with a milk receptacle having an end opening and milk inlet, of removable closures for said end opening and milk inlet, and an air conducting tube leading into said receptacle and communicating with the interior thereof, and means for closing the outer end of said air conductor.

2. In a milk can, the combination with a receptacle having an end opening and a side opening, and detachable closures therefor, said side opening being adapted to receive a funnel body, of an air conducting pipe leading through said end closure into said receptacle and communicating with the interior thereof, and a removable closure for said air pipe.

In testimony whereof I affix my signature in presence of two witnesses.

GEORGE H. MARTING.

Witnesses:
A. L. PHELPS,
L. CARL STOUGHTON.